US012621375B2

(12) United States Patent (10) Patent No.: US 12,621,375 B2
Ma et al. (45) Date of Patent: May 5, 2026

(54) DATA UPLOADING METHOD AND APPARATUS, DEVICE, AND MEDIUM

(71) Applicant: BEIJING BYTEDANCE NETWORK TECHNOLOGY CO., LTD., Beijing (CN)

(72) Inventors: Qian Ma, Beijing (CN); Liyang Sun, Los Angeles, CA (US); Mingming Shen, Beijing (CN); Hao Dong, Beijing (CN); Lei Zhai, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 68 days.

(21) Appl. No.: 18/844,904

(22) PCT Filed: Feb. 28, 2023

(86) PCT No.: PCT/CN2023/078820
§ 371 (c)(1),
(2) Date: Sep. 6, 2024

(87) PCT Pub. No.: WO2023/169261
PCT Pub. Date: Sep. 14, 2023

(65) Prior Publication Data
US 2025/0227166 A1 Jul. 10, 2025

(30) Foreign Application Priority Data
Mar. 9, 2022 (CN) .......................... 202210226539.3

(51) Int. Cl.
*H04L 69/18* (2022.01)
*H04L 43/0864* (2022.01)
(Continued)

(52) U.S. Cl.
CPC .......... *H04L 69/18* (2013.01); *H04L 43/0864* (2013.01); *H04L 43/50* (2013.01); *H04L 67/34* (2013.01)

(58) Field of Classification Search
CPC ..... H04L 69/18; H04L 43/0864; H04L 43/50; H04L 67/34; H04L 43/0888; H04L 67/06; H04L 43/08; H04L 43/0817
See application file for complete search history.

(56) References Cited

U.S. PATENT DOCUMENTS 10,855,813 B1 12/2020 Moriarty et al.
2006/0009159 A1 1/2006 Leung
(Continued)

FOREIGN PATENT DOCUMENTS

CN 104539596 A 4/2015
CN 105871509 A * 8/2016 ............. H04L 69/24
(Continued)

OTHER PUBLICATIONS

Qu et al.; "Design and implementation of a reliable data transmission technology"; Journal of Xi'an University of Posts and Telecommunications; vol. 21 No. 2; Mar. 2016; p. 40-45.
(Continued)

*Primary Examiner* — Kamal M Hossain
(74) *Attorney, Agent, or Firm* — BakerHostetler

(57) ABSTRACT

Embodiments of the present disclosure disclose a data uploading method and apparatus, a device, and a medium. The method includes: in response to a preset operation triggered by a user before uploading application data,
(Continued)

in response to a preset operation triggered by a user before uploading application data, obtaining at least two data uploading protocols —S210 calling a domain name acquiring interface of a server and acquiring a currently available domain name corresponding to the each data uploading protocol —S220 base on the preset performance test mode and the currently available domain name corresponding to the each data uploading protocol, performing the data uploading performance tests on the each data uploading protocol, and determining a target uploading protocol matched with current network based on the performance test result —S230 in response to the application data uploading operation triggered by the user, uploading the target application data to be uploaded based on the target uploading protocol and the currently available domain name corresponding to the target uploading protocol —S240 obtaining at least two data uploading protocols; performing data uploading performance testing on each data uploading protocol on the basis of a preset performance testing means, and determining a target uploading protocol that matches with a current network on the basis of a performance testing result; and in response to an application data uploading operation triggered by the user, uploading current target application data to be uploaded on the basis of the target uploading protocol.

18 Claims, 3 Drawing Sheets

(51) Int. Cl.

| | | |
|---|---|---|
| *H04L 43/0888* | (2022.01) | |
| *H04L 43/50* | (2022.01) | |
| *H04L 67/00* | (2022.01) | |
| *H04L 43/08* | (2022.01) | |
| *H04L 43/0817* | (2022.01) | |
| *H04L 67/06* | (2022.01) | |

(56) References Cited

U.S. PATENT DOCUMENTS

| | | | |
|---|---|---|---|
| 2014/0075326 A1 | 3/2014 | Cao et al. | |
| 2019/0379668 A1 | 12/2019 | Baran et al. | |
| 2020/0045109 A1 | 2/2020 | Hegde et al. | |
| 2020/0322460 A1* | 10/2020 | Bryson | G06F 11/3006 |

FOREIGN PATENT DOCUMENTS

| | | |
|---|---|---|
| CN | 110290067 A | 9/2019 |
| CN | 110944012 A | 3/2020 |
| CN | 112688824 A | 4/2021 |
| CN | 113382062 A | 9/2021 |
| WO | WO 2016/155635 A1 | 10/2016 |

OTHER PUBLICATIONS

China Patent Application No. 202210226539.3; Office Action; dated Dec. 6, 2023; 13 pages.
International Patent Application No. PCT/CN2023/078820; Int'l Search Report; dated May 23, 2023; 2 pages.

* cited by examiner

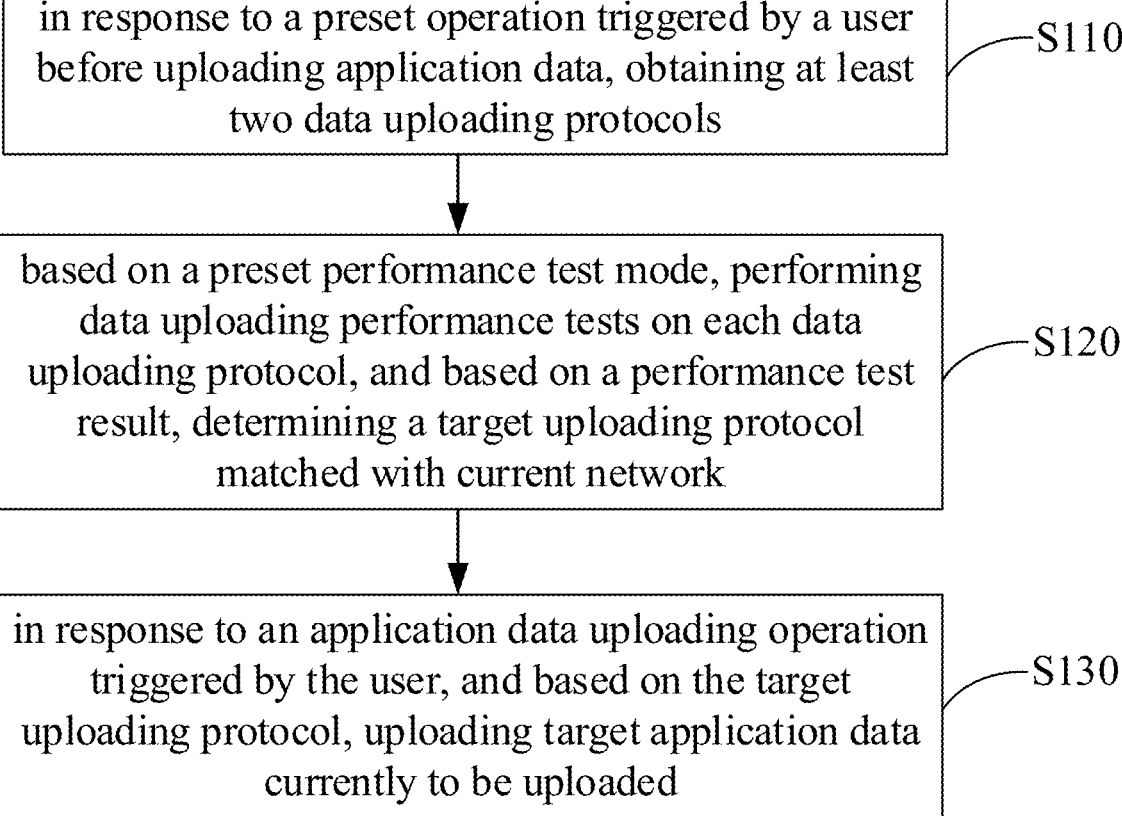

in response to a preset operation triggered by a user before uploading application data, obtaining at least two data uploading protocols ──S110 based on a preset performance test mode, performing data uploading performance tests on each data uploading protocol, and based on a performance test result, determining a target uploading protocol matched with current network ──S120 in response to an application data uploading operation triggered by the user, and based on the target uploading protocol, uploading target application data currently to be uploaded ──S130

Fig. 1

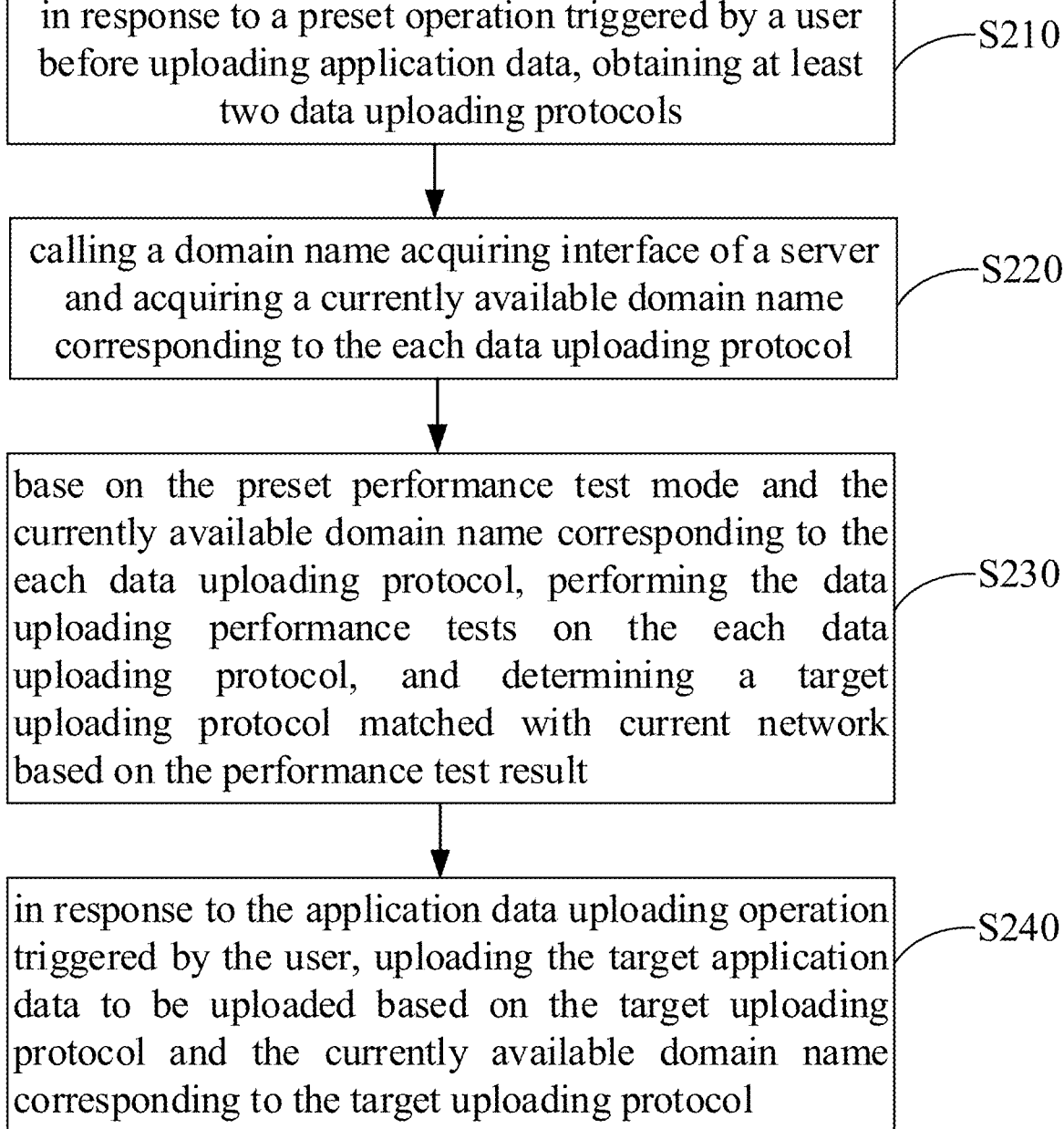

in response to a preset operation triggered by a user before uploading application data, obtaining at least two data uploading protocols ⟋—S210 calling a domain name acquiring interface of a server and acquiring a currently available domain name corresponding to the each data uploading protocol ⟋—S220 base on the preset performance test mode and the currently available domain name corresponding to the each data uploading protocol, performing the data uploading performance tests on the each data uploading protocol, and determining a target uploading protocol matched with current network based on the performance test result ⟋—S230 in response to the application data uploading operation triggered by the user, uploading the target application data to be uploaded based on the target uploading protocol and the currently available domain name corresponding to the target uploading protocol ⟋—S240

Fig. 2

DATA UPLOADING METHOD AND APPARATUS, DEVICE, AND MEDIUM

This application is a national phase application of International Patent Application No. PCT/CN2023/078820, filed on Feb. 28, 2023, which claims the priority to and benefits of the Chinee Patent Application No. 20210226539.3, filed on Mar. 9, 2022. All the aforementioned patent applications are hereby incorporated by reference in their entireties.

TECHNICAL FIELD

The embodiment of the present disclosure relates to Internet technology, for example to a data uploading method, apparatus, device and medium.

BACKGROUND

With the development of the Internet, users can upload application data through the network. For example, users can upload a captured video to a server of an application. An uploading process of application data depends on an uploading protocol of a transport layer. At present, users' application data is usually uploaded by using a fixed uploading protocol. However, under different network conditions, using a single fixed uploading protocol cannot effectively guarantee upload performance, thus reducing users' experience.

SUMMARY

The embodiments of the present disclosure provides a data uploading method, an apparatus, a device and a medium, so as to realize dynamic switching of data uploading protocols, effectively ensure uploading performance and improve user's experience.

In a first aspect, the embodiments of the present disclosure provide a data uploading method, including:

in response to a preset operation triggered by a user before uploading application data, obtaining at least two data uploading protocols;

based on a preset performance test mode, performing data uploading performance tests on each data uploading protocol, and based on a performance test result, determining a target uploading protocol matched with current network; and in response to an application data uploading operation triggered by the user, and based on the target uploading protocol, uploading target application data currently to be uploaded.

In a second aspect, the embodiments of the present disclosure further provide a data uploading apparatus, including:

a data uploading protocol obtaining module, configured to obtain at least two data uploading protocols in response to a preset operation triggered by a user before uploading application data;

a performance test module, configured to perform data uploading performance tests on each data uploading protocol based on a preset performance test mode, and determine a target uploading protocol matched with current network based on a performance testing result; and an application data uploading module, configured to upload target application data currently to be uploaded based on the target uploading protocol in response to an application data uploading operation triggered by the user.

In a third aspect, the embodiments of the present disclosure further provide an electronic device, which includes:

at least one processor;

a memory, configured to store at least one program;

in the case where the at least one program is executed by the at least one processor, the at least one processor is caused to realize the data uploading method provided by any embodiment of the present disclosure.

In a fourth aspect, the embodiments of the present disclosure further provide a computer-readable storage medium, on which a computer program is stored, the data uploading method provided by any embodiment of the present disclosure is realized in the case where the program is executed by a processor.

BRIEF DESCRIPTION OF DRAWINGS

FIG. 1 is a flowchart of a data uploading method provided in embodiment 1 of the present disclosure;

FIG. 2 is a flowchart of a data uploading method provided in embodiment 2 of the present disclosure;

DETAILED DESCRIPTION

Figure 3:
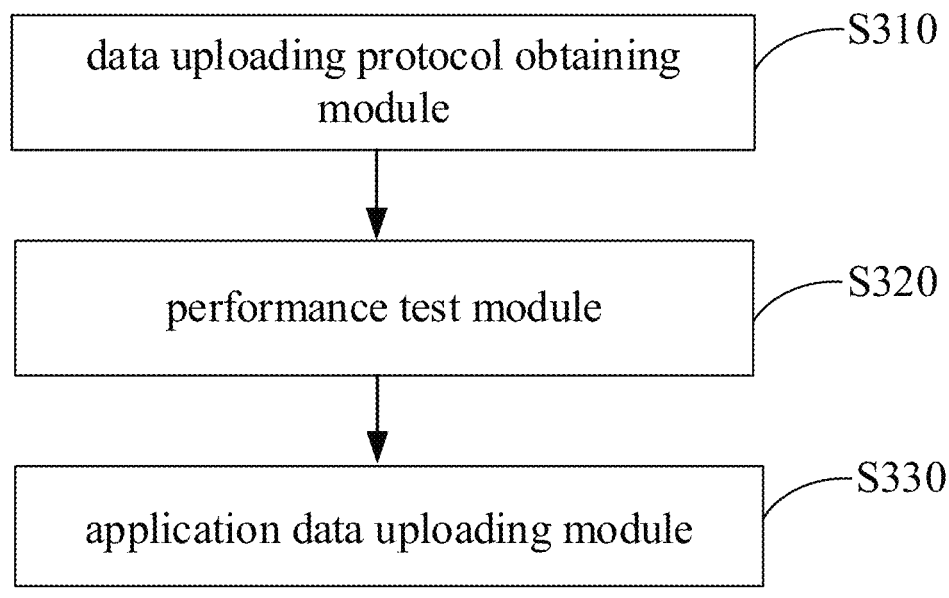
FIG. 3 is a structural schematic diagram of a data uploading apparatus provided in embodiment 3 of the present disclosure.

Embodiments of the present disclosure will be described in more detail below with reference to the accompanying drawings.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that the modifications of "one" and "more" mentioned in the present disclosure are schematic rather than restrictive, and those skilled in the art should understand that unless otherwise explicitly stated in the context, it should be understood as "at least one".

Names of messages or information exchanged among multiple apparatuses in the embodiment of the present disclosure are only configured for illustrative purposes, and are not configured to limit the scope of these messages or information.

Embodiment 1

FIG. 1 is a flowchart of a data uploading method provided in embodiment 1 of the present disclosure, this embodiment can be applied to uploading application data, especially to uploading videos that users intend to publish. The method can be executed by a data uploading apparatus, which can be realized by software and/or hardware and integrated into an electronic device, such as a client. As illustrated in FIG. 1, the method specifically includes the following steps:

S110: in response to a preset operation triggered by a user before uploading application data, obtaining at least two data uploading protocols.

The application data can refer to the data in the client that needs to be uploaded to the server in the application background. For example, the application data can be, but not limited to, an audio and a video, an image or a file. The preset operation can be a preparation operation that is pre-set based on the business scenario before the user uploads the application data, that is, an operation for triggering the selection of the data uploading protocol. For example, the preset operation can be, but not limited to, a data collecting operation, a data importing operation or a data editing operation. For example, in a scene where a user publishes a video, the subsequent protocol selection operation can be triggered in the case where the user shoots a video, imports a video, or edits the shot or imported video.

The data uploading protocol may refer to the data uploading protocol supported by a transport layer. For example, the data uploading protocol may include, but is not limited to, an uploading protocol based on a transmission control protocol (TCP), an uploading protocol based on a user datagram protocol (UDP) or a self-defined uploading protocol. Among them, the uploading protocol based on TCP uses TCP-related strategies, including "three-way handshake" for establishing connection, a congestion control algorithm and so on. In contrast, the uploading protocol based on UDP is more lightweight and has better performance in weak networks (high delay and high packet loss rate). The uploading protocol based on UDP can be but not limited to the low-latency Internet transport layer protocol QUIC (Quick UDP Internet Connection) protocol based on UDP. The self-defined uploading protocol is a self-developed protocol based on business requirements, which has higher flexibility and can add self-defined transmission optimization strategies, such as FEC (Forward Error Correction), the congestion control algorithm and so on.

Exemplarily, in the case where the preset operation triggered by the user is detected, it indicates that the user will upload data next, and at this time, at least two data uploading protocols currently supported by the client can be obtained, so as to select a current optimal data uploading protocol from these data uploading protocols.

It should be noted that the protocol selection process takes a certain time and the current network situation is dynamic, the subsequent protocol selection operation is carried out after the user triggers the preset operation, which can ensure the free time for protocol performance testing and the timeliness of the selected protocol.

S120: based on a preset performance test mode, performing data uploading performance tests on each data uploading protocol, and based on a performance test result, determining a target uploading protocol matched with current network.

The preset performance test mode can refer to the mode of testing the current uploading performance of the data uploading protocol under the current network condition. The target uploading protocol can refer to the data uploading protocol with the optimal upload performance under the current network condition.

Exemplarily, in S120, the "based on a preset performance test mode, performing data uploading performance tests on each data uploading protocol" may include: based on each data uploading protocol, uploading a preset data packet, and determining the performance test result corresponding to each data uploading protocol.

The preset data packet can refer to a fixed-size meaningless speed test data packet. The preset data packet does not contain user's information, so as to protect user's privacy. Exemplarily, the client can upload the preset data packet through the same domain name by using each data uploading protocol, so as to detect the uploading performance and network quality of each data uploading protocol. The performance test result corresponding to each data uploading protocol under the current network condition can be obtained after the detection is completed.

For example, the performance test result can include, but is not limited to, performance test index results such as information about whether the speed test is successful, network speed information and round-trip time information. The embodiment of the present disclosure can select the most suitable data uploading protocol under the current network, that is the target uploading protocol, by comparing the performance test results of each protocol, so as to effectively ensure the uploading performance, such as reducing the uploading time and improving the uploading success rate. For example, the process of determining the target uploading protocol can be as follows: the uploading protocol with successful speed test is selected first; in the case where at least two uploading protocols with successful speed test exist, the uploading protocol with the highest network speed is selected from the uploading protocols with successful speed test; in the case where at least two uploading protocols with the highest network, the uploading protocol with the shortest round-trip time is selected from the uploading protocols with the highest network, so as to obtain the target uploading protocol with the best performance under the current network and optimize the subsequent uploading experience.

S130: in response to an application data uploading operation triggered by the user, and based on the target uploading protocol, uploading target application data currently to be uploaded.

Exemplarily, in the case where the application data uploading operation triggered by the user is detected, for example, the user clicks a preset uploading button, the target application data that the user needs to upload is uploaded based on the currently selected target uploading protocol, so that the uploading time of the target application data can be reduced, the uploading success rate can be improved, the uploading performance of the target application data can be optimized, and the user's experience can be improved; and by selecting different target uploading protocols to upload data under different network conditions, the dynamic switching of the data uploading protocols can be realized.

For example, S130 may include: in response to that the target uploading protocol is the self-defined uploading protocol, performing a configuration optimization on the self-defined uploading protocol based on a performance test result corresponding to the self-defined uploading protocol to obtain optimized target configuration information; uploading the target application data currently to be uploaded based on the self-defined uploading protocol and the target configuration information.

Exemplarily, because the self-defined uploading protocol has more flexible configuration capability and can be dynamically configured, the configuration information of the self-defined uploading protocol can be optimized for the second time based on the performance test result corresponding to the self-defined uploading protocol to obtain optimized target configuration information, such as optimized forward error correction parameter configuration information, congestion control parameter configuration information or connection establishment mode parameter configuration information. By using the self-defined uploading protocol configured by the target configuration information to upload the target application data, the uploading performance can be further optimized, and the user's experience can be improved.

The technical scheme of the embodiments of the present disclosure, by obtaining at least two data uploading protocols in response to the preset operation triggered by the user before uploading application data; performing the data uploading performance tests on each data uploading protocol based on the preset performance test mode, and determining the target uploading protocol matched with current network based on the performance test result; and in response to the application data uploading operation triggered by the user, uploading target application data currently to be uploaded based on the target uploading protocol, therefore, before uploading the application data, the optimal target uploading protocol can be selected to upload the application data through the performance test, which effectively ensures the uploading performance, and different uploading protocols can be selected to upload data under different network conditions, which realizes the dynamic switching of data uploading protocols during each data uploading, optimizes the uploading performance and improves the user's experience.

On the basis of the above technical scheme, the method may further include: in the case where the performance test is not completely completed when the user triggers the application data uploading operation, determining the target uploading protocol matched with the current network based on at least two performance test results currently completed, or, determining the target uploading protocol matched with the current network based on the device model information of an uploading terminal and/or historical uploading information of the user.

Exemplarily, in the case where a time interval between the preset operation and the data uploading operation triggered by the user is short, and the performance of all data uploading protocols has not been tested, at this time, in the case where the performance tests of at least two protocols have been completed at present, the obtained performance test results can be compared to determine the target uploading protocol that is matched with the current network. Alternatively, based on the device model information of the uploading terminal (such as the client), for example, model version information and model price information, the embodiment can further determine the performance category of the uploading terminal, such as high-level device and low-level device. For example, in the case where the uploading terminal is a high-level device, the uploading protocol based on TCP can be configured as the target uploading protocol; in the case where the uploading terminal is a low-level device, the uploading protocol based on UDP can be configured as the target uploading protocol. The embodiment can further, based on the historical uploading information of the user, for example, take the protocol used in the last uploading as the target uploading protocol used in the present uploading. Or, whether the time interval between the local uploading trigger time and the last uploading trigger time is larger than the preset effective duration can be detected, in the case where the time interval between the local uploading trigger time and the last uploading trigger time is less than or equal to the preset effective duration, the protocol used in the last uploading can be taken as the target uploading protocol used in the present uploading; in the case where the time interval between the local uploading trigger time and the last uploading trigger time is larger than the preset effective duration, it indicates that the protocol used in the last uploading has expired, at this time, the target uploading protocol can be determined based on the device model information of the uploading terminal.

On the basis of the above technical schemes, the method can further include: monitoring an uploading performance index in the uploading process of the target application data; in the case where the uploading performance index meets a preset protocol switching condition, stopping the uploading operation, re-determining the target uploading protocol matched with the current network, and uploading remaining application data which is not uploaded currently based on re-determined target uploading protocol.

The uploading performance index may include, but is not limited to, the uploading speed and the number of failed uploading fragments.

Exemplarily, in the case where the network condition changes rapidly, for example, when the network condition in the uploading process is completely different from the network condition before uploading, the target uploading protocol selected before uploading may not be the protocol with the optimal uploading performance. In view of this situation, in the process of uploading the target application data with the target uploading protocol, the protocol switching can be triggered again by monitoring the uploading performance index in real time. For example, in the case where the monitored uploading performance index meets the preset protocol switching condition, for example, the uploading speed is less than the preset speed, and/or the number of failed uploading fragments is greater than the preset number, the current uploading operation can be stopped, and the data uploading performance of each data uploading protocol is tested again based on the preset performance test mode, and the target uploading protocol matched with the current network is re-determined, and the remaining application data that has not been uploaded at present is continuously uploaded based on the re-determined target uploading protocol, thereby realizing the dynamic adjustment of the protocols, optimizing the uploading performance, and improving user's experience.

Embodiment 2

FIG. 2 is a flowchart of a data uploading method provided in embodiment 2 of the present disclosure, based on the above embodiment, after obtaining at least two data uploading protocols, the embodiment further includes: calling a domain name acquiring interface of a server and acquiring a currently available domain name corresponding to each data uploading protocol, and further refining the data uploading mode on this basis. Explanations of terms that are the same as or corresponding to the above-mentioned embodiments are not repeated here.

Referring to FIG. 2, the data uploading method provided by the embodiment includes the following steps:

S210: in response to a preset operation triggered by a user before uploading application data, obtaining at least two data uploading protocols.

S220: calling a domain name acquiring interface of a server and acquiring a currently available domain name corresponding to the each data uploading protocol.

The currently available domain name may refer to the currently available domain name specified when transmitting data by using the data uploading protocol. Each data uploading protocol can correspond to a dedicated domain name.

Exemplarily, the client can obtain the currently available domain name and related domain name information from the server by calling the domain name acquiring interface of the server, the domain name information includes the protocol supported by the domain name, and based on the obtained domain name information, the currently available domain name corresponding to each data uploading protocol can be determined.

Exemplarily, S220 may include: detecting whether a current cache duration of a last available domain name corresponding to the each data uploading protocol is greater than a preset effective duration; in the case where the current cache duration of the last available domain name corresponding to the each data uploading protocol is greater than the preset effective duration, calling the domain name acquiring interface of the server and acquiring the currently available domain name corresponding to the data uploading protocol; in the case where the current cache duration of the last available domain name corresponding to the each data uploading protocol is less than or equal to the preset effective duration, taking the last available domain name corresponding to the data uploading protocol as the currently available domain name corresponding to the data uploading protocol.

Every time the client acquires a domain name, the available domain name corresponding to each data uploading protocol can be updated and cached, so that in the case where a domain name needs to be acquired next time, whether the current cache duration of the last available domain name corresponding to each uploading protocol is greater than the preset effective duration (for example, 15 minutes) can be first detected, in the case where the current cache duration of the last available domain name corresponding to the uploading protocol is greater than the preset effective duration, it indicates that the last available domain name has expired, and it is necessary to acquire the currently available domain name corresponding to the data uploading protocol by calling the domain name acquiring interface of the server. In the case where the current cache duration of the last available domain name corresponding to the uploading protocol is less than or equal to the preset effective duration, the last available domain name can be directly configured as the currently available domain name for data uploading, thereby avoiding frequent calling of the domain name acquiring interface and saving device resource.

S230: base on the preset performance test mode and the currently available domain name corresponding to each data uploading protocol, performing the data uploading performance tests on each data uploading protocol, and determining a target uploading protocol matched with current network based on the performance test result.

Exemplarily, in the case of performing the data uploading performance tests on each data uploading protocol, the preset data packet can be uploaded to the server by using the currently available domain name corresponding to each data uploading protocol, so as to uploading data by using the dedicated domain name of each data uploading protocol, which can improve the uploading efficiency and further optimize the uploading performance.

S240: in response to the application data uploading operation triggered by the user, uploading the target application data to be uploaded based on the target uploading protocol and the currently available domain name corresponding to the target uploading protocol.

Exemplarily, in the case where the application data uploading operation triggered by the user is detected, the target application data can be uploaded to the server by using the currently available domain name corresponding to the target uploading protocol, so that the target application data can be uploaded by using the dedicated domain name of the target uploading protocol, which can improve the uploading efficiency, and further optimize the uploading performance.

In the technical scheme of this embodiment, by calling the domain name acquiring interface of the server and acquiring the currently available domain name corresponding to the each data uploading protocol, performing the data uploading performance tests on each data uploading protocol base on the preset performance test mode and the currently available domain name corresponding to each data uploading protocol, and uploading the target application data currently to be uploaded based on the target uploading protocol and the currently available domain name corresponding to the target uploading protocol, the data can be uploaded by using the protocol's dedicated domain name, which can improve the uploading efficiency and further optimize the uploading performance.

The following is an example of the data uploading apparatus provided by the embodiments of the present disclosure, which belong to the same inventive concept as the data uploading method of the above embodiment, for details not described elaborately in the embodiments of the data uploading apparatus, please refer to the data uploading method of the above embodiments.

Embodiment 3

FIG. 3 is a structural schematic diagram of a data uploading apparatus provided in embodiment 3 of the present disclosure, this embodiment can be applied to uploading application data, especially to uploading videos that users intend to publish. As illustrated in FIG. 3, the apparatus includes: a data uploading protocol obtaining module 310, a performance test module 320 and an application data uploading module 330.

The data uploading protocol obtaining module 310 is configured to obtain at least two data uploading protocols in response to a preset operation triggered by a user before uploading application data; the performance testing module 320 is configured to perform a data uploading performance tests on each data uploading protocol based on a preset performance test mode, and determine a target uploading protocol matched with current network based on a performance testing result; the application data uploading module 330 is configured to upload target application data currently to be uploaded based on the target uploading protocol in response to an application data uploading operation triggered by the user.

The technical scheme of the embodiments of the present disclosure, by obtaining at least two data uploading protocols in response to the preset operation triggered by the user before uploading application data; performing the data uploading performance tests on each data uploading protocol based on the preset performance test mode, and determining the target uploading protocol matched with current network based on the performance test result; and in response to the application data uploading operation triggered by the user, uploading target application data currently to be uploaded based on the target uploading protocol, therefore, before uploading the application data, the optimal target uploading protocol can be selected to upload the application data through the performance test, which effectively ensures the uploading performance, and different uploading protocols can be selected to upload data under different network conditions, which realizes the dynamic switching of data uploading protocols, optimizes the uploading performance and improves the user's experience.

On the basis of the above technical scheme, the application data includes: an audio, a video, an image or a file; the preset operation includes: a data collecting operation, a data importing operation or a data editing operation.

On the basis of the above technical schemes, the performance test module 320 is configured to, based on the each data uploading protocol, upload a preset data packet, and determine the performance test result corresponding to the each data uploading protocol.

On the basis of the above technical schemes, the performance test result includes: information about whether a speed test is successful, network speed information and round-trip time information.

On the basis of the above technical schemes, the apparatus further includes:

a target uploading protocol determining module, which is configured to, in the case where the performance test is not completely completed when the user triggers the application data uploading operation, determine the target uploading protocol matched with the current network based on at least two performance test results currently completed, or, determine the target uploading protocol matched with the current network based on device model information of an uploading terminal and/or historical uploading information of the user.

On the basis of the above technical schemes, the data uploading protocol includes: an uploading protocol based on a transmission control protocol TCP, an uploading protocol based on a user datagram protocol UDP or a self-defined uploading protocol.

On the basis of the above technical schemes, the application data uploading module 330 is configured to:

in the case where the target uploading protocol is the self-defined uploading protocol, perform a configuration optimization on the self-defined uploading protocol based on the performance test result corresponding to the self-defined uploading protocol to obtain optimized target configuration information; and upload the target application data currently to be uploaded based on the self-defined uploading protocol and the target configuration information.

On the basis of the above technical schemes, the apparatus further includes:

a protocol switching module, which is configured to monitor an uploading performance index in an uploading process of the target application data; and in the case where the uploading performance index meets a preset protocol switching condition, stop an uploading operation, re-determine the target uploading protocol matched with the current network, and upload remaining application data which is not uploaded currently based on re-determined target uploading protocol.

On the basis of the above technical schemes, the apparatus further includes:

a domain name acquiring module, which is configured to, after obtaining at least two data uploading protocols, call a domain name acquiring interface of a server and acquire a currently available domain name corresponding to each data uploading protocol.

On the basis of the above technical schemes, the performance test module 320 is configured to base on the preset performance test mode and the currently available domain name corresponding to the each data uploading protocol, perform the data uploading performance test on the each data uploading protocol.

The application data uploading module 330 is configured to, based on the target uploading protocol and the currently available domain name corresponding to the target uploading protocol, upload the target application data currently to be uploaded.

On the basis of the above technical schemes, the domain name acquiring module is configured to:

detect whether a current cache duration of the last available domain name corresponding to each data uploading protocol is greater than a preset effective duration; in response to that the current cache duration detected of the last available domain name corresponding to the each data uploading protocol is greater than the preset effective duration, call the domain name acquiring interface of the server and acquire the currently available domain name corresponding to the data uploading protocol; in response to that the current cache duration detected of the last available domain name corresponding to the each data uploading protocol is less than or equal to the preset effective duration, take the last available domain name corresponding to the data uploading protocol as the currently available domain name corresponding to the data uploading protocol.

The data uploading apparatus provided by the embodiment of the present disclosure can execute the data uploading method provided by any embodiment of the present disclosure, and has corresponding functional modules for executing the data uploading method.

It is worth noting that in the above embodiments of the data uploading apparatus, each unit and module included is only divided according to functional logic, but it is not limited to the above division, as long as the corresponding functions can be realized; in addition, the specific names of each functional unit are only for the convenience of distinguishing between each other, and are not configured to limit the protection scope of the present disclosure.

Embodiment 4

Figure 4:
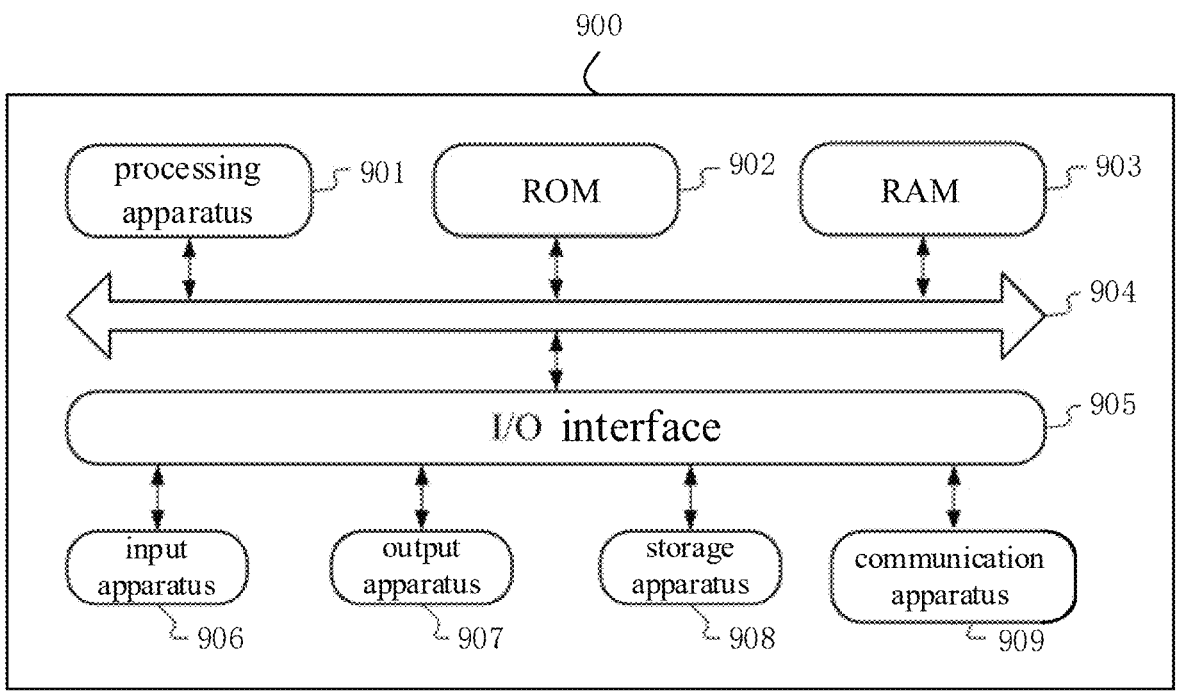
FIG. 4 is a structural schematic diagram of an electronic device provided in embodiment 4 of the present disclosure.

Reference is now made to FIG. 4, which illustrates a schematic diagram of a structure of an electronic apparatus 900 suitable for implementing the embodiments of the present disclosure. The electronic device illustrated in FIG. 4 is only an example, and should not bring any limitation to the function and application scope of the embodiments of the present disclosure.

As illustrated in FIG. 4, the electronic apparatus 900 may include a processing apparatus (for example, a central processing unit, a graphics processing unit and the like) 901, which may perform various suitable actions and processes according to a program stored in a read-only memory (Read-Only Memory, ROM) or a program loaded from a storage apparatus 908 into a random-access memory (Random Access Memory, RAM) 903. In the RAM 903, various programs and data required for operations of the electronic apparatus 900 are further stored. The processing apparatus 901, the ROM 902 and the RAM 903 are interconnected by means of a bus 904. An input/output (Input/Output, I/O) interface 905 is also connected to the bus 904.

Generally, the following devices may be connected to the I/O interface 905: an input apparatus 906 including, for example, a touch screen, a touch pad, a keyboard, a mouse, a camera, a microphone, an accelerometer, a gyroscope, etc.; an output apparatus 907 including, for example, a liquid crystal display (Liquid Crystal Display, LCD), a loudspeaker, a vibrator, etc.; a storage apparatus 908 including, for example, a magnetic tape, a hard disk, etc.; and a communication apparatus 909. The communication apparatus 909 may allow the electronic apparatus 900 to perform wireless or wired communication with other devices to exchange data. While the electronic apparatus 900 with various devices is illustrated in FIG. 4, it should be understood that it is not required to implement or have all the devices illustrated. It may implement alternatively or possess the more or less apparatuses.

In particular, according to the embodiments of the present disclosure, the processes described above with reference to the flowcharts may be implemented as a computer software program. For example, an embodiment of the present disclosure includes a computer program product, which includes a computer program carried by a non-transitory computer-readable medium, the computer program includes program codes for performing the method illustrated in the flowchart. In such an embodiment, the computer program may be downloaded and installed from a network through the communication apparatus 909, or installed from the storage apparatus 908, or installed from the ROM 902. When the computer program is executed by the processing apparatus 901, the above-mentioned functions defined in the method of the embodiment of the present disclosure are performed.

The electronic device provided by the embodiments of the present disclosure belong to the same inventive concept as the data uploading method provided by the above embodiments, and the technical details not described elaborately in the embodiment of this disclosure can be found in the above embodiments.

Embodiment 5

The embodiments of the present disclosure provide a computer storage medium on which a computer program is stored, the data uploading method provided by the embodiments above can be realized in the case where the program is executed by a processor.

It should be noted that the computer-readable medium mentioned above in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, device or device, or any combination thereof. More specific examples of the computer-readable storage medium may include, but not limited to: an electrical connection with one or more wires, a portable computer disk, a hard disk, a random access memory (RAM), a read-only memory (ROM), an erasable programmable read-only memory (Erasable Programmable Read-Only Memory, EPROM or flash memory), an optical fiber, a portable compact disk read-only memory (Compact Disc Read-Only Memory, CD-ROM), an optical storage device, a magnetic storage device, or any suitable combination of the above. In the present disclosure, the computer-readable storage medium may be any tangible medium containing or storing a program that may be used by or in combination with an instruction execution system, device or device. In the present disclosure, the computer-readable signal medium may include a data signal propagated in a baseband or as a part of a carrier wave, in which computer-readable program codes are carried. This propagated data signal may take multiple forms, including but not limited to an electromagnetic signal, an optical signal or any suitable combination of the above. The computer-readable signal medium may also be any computer-readable medium other than the computer-readable storage medium, and may send, propagate or transmit a program used by or in combination with an instruction execution system, device or device. The program codes contained on the computer-readable medium may be transmitted by any suitable medium, including but not limited to: an electric wire, a fiber-optic cable, radio frequency (RF) and the like, or any suitable combination of the above.

In some implementation methods, a client and the server can communicate by using any currently known or future developed network protocol such as a hypertext transfer protocol (HTTP), and may communicate and interconnect with digital data in any form or medium (for example, a communication network). Examples of the communication network include a local area network (Local Area Network, "LAN"), a wide area network (Wide Area Network, "WAN"), the Internet work (for example, the Internet) and an end-to-end network (for example, an ad hoc end-to-end network), as well as any currently known or to be researched and developed in the future.

The computer-readable medium described above may be included in the above-mentioned electronic device; or it may exist alone without being assembled into the electronic device.

The computer-readable medium carries one or more programs, which, when executed by the server, cause the server to: acquire at least two data uploading protocols in response to a preset operation triggered by a user before uploading application data; perform data uploading performance tests on each data uploading protocol based on a preset performance test mode, and determine a target uploading protocol matched with that current network based on the performance test result; In response to the application data uploading operation triggered by the user, the target application data to be uploaded at present is uploaded based on the target uploading protocol.

Computer program codes for performing the operations of the present disclosure may be written in one or more programming languages or a combination thereof, the programming languages include, but are not limited to, object-oriented programming languages such as Java, Smalltalk and C++, and further include conventional procedural programming languages such as "C" programming language or similar programming languages. The program codes may be entirely executed on a user's computer, partially executed on the user's computer, executed as an independent software package, partially executed on the user's computer and partially executed on a remote computer, or entirely executed on the remote computer or a server. In the case involving the remote computer, the remote computer may be connected to the user's computer through any type of network, including a local area network (LAN) or a wide area network (WAN), or may be connected to an external computer (for example, through the Internet using an Internet service provider).

The flowcharts and block diagrams in the accompanying drawings illustrate the architecture, function and operation of possible implementations of the systems, methods and the computer program product according to various embodiments of the present disclosure. In this regard, each block in the flowcharts or block diagrams may represent a module, a program segment, or a part of codes, which includes one or more executable instructions for implementing specified logical functions. It should also be noted that, in some alternative implementations, the functions noted in the blocks may occur out of the order noted in the accompanying drawings. For example, two blocks illustrated in succession may, in fact, be executed substantially in parallel, and may sometimes be executed in a reverse order, depending on the function involved. It should also be noted that, each block in the block diagrams and/or flowcharts, and combinations of blocks in the block diagrams and/or flow diagrams, may be implemented by a dedicated hardware-based system that performs specified functions or operations, or by a combination of dedicated hardware and computer instructions.

The units involved in the embodiments described in the present disclosure may be implemented by software or hardware. Among them, the name of the unit does not constitute a limitation on the unit itself in some cases. For example, an editable content display unit can also be described as an "editing unit".

The functions described above herein may be at least partially performed by one or more hardware logic components. For example, without limitation, available exemplary types of hardware logic components include: a field programmable gate array (Field Programmable Gate Array, FPGA), an application specific integrated circuit (Application Specific Integrated Circuit, ASIC), an application specific standard product (Application Specific Standard Parts, ASSP), a system on chip (System on Chip, SOC), a complex programmable logic device (Complex Programmable Logic Device, CPLD) and the like.

In the context of the present disclosure, the machine-readable medium may be a tangible medium that may include or store a program used by or in connection with an instruction execution system, device or device. The machine-readable medium may be a machine-readable signal medium or a machine-readable storage medium. The machine-readable medium may include, but is not limited to, an electronic, magnetic, optical, electromagnetic, infrared, or semiconductor system, device or device, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

According to at least one embodiment of the present disclosure, [Example 1] provides a data uploading method, which includes:

in response to a preset operation triggered by a user before uploading application data, obtaining at least two data uploading protocols;

based on a preset performance test mode, performing data uploading performance tests on each data uploading protocol, and based on a performance test result, determining a target uploading protocol matched with current network; and in response to an application data uploading operation triggered by the user, and based on the target uploading protocol, uploading target application data currently to be uploaded.

According to at least one embodiment of the present disclosure, [Example 2] provides a data uploading method, which further includes that:

optionally, the application data includes: an audio, a video, an image or a file; and the preset operation comprises: a data collecting operation, a data importing operation or a data editing operation.

According to at least one embodiment of the present disclosure, [Example 3] provides a data uploading method, which further includes that:

optionally, the based on a preset performance test mode, performing data uploading performance tests on each data uploading protocol, includes:

based on the each data uploading protocol, uploading a preset data packet, and determining the performance test result corresponding to the each data uploading protocol.

According to at least one embodiment of the present disclosure, [Example 4] provides a data uploading method, which further includes that:

optionally, the performance test result includes: information about whether a speed test is successful, network speed information and round-trip time information.

According to at least one embodiment of the present disclosure, [Example 5] provides a data uploading method, which further includes that:

optionally, the method further includes:

in the case where the performance test is not completely completed when the user triggers the application data uploading operation, determining the target uploading protocol matched with the current network based on at least two performance test results currently completed, or, determining the target uploading protocol matched with the current network based on device model information of an uploading terminal and/or historical uploading information of the user.

According to at least one embodiment of the present disclosure, [Example 6] provides a data uploading method, which further includes that:

optionally, the data uploading protocol includes: an uploading protocol based on a transmission control protocol TCP, an uploading protocol based on a user datagram protocol UDP or a self-defined uploading protocol.

According to at least one embodiment of the present disclosure, [Example 7] provides a data uploading method, which further includes that:

optionally, the uploading target application data currently to be uploaded based on the target uploading protocol includes:

in the case where the target uploading protocol is the self-defined uploading protocol, performing a configuration optimization on the self-defined uploading protocol based on a performance test result corresponding to the self-defined uploading protocol to obtain optimized target configuration information; and uploading the target application data currently to be uploaded based on the self-defined uploading protocol and the target configuration information.

According to at least one embodiment of the present disclosure, [Example 8] provides a data uploading method, which further includes that:

optionally, the method further includes:

monitoring an uploading performance index in an uploading process of the target application data;

in the case where the uploading performance index meets a preset protocol switching condition, stopping an uploading operation, re-determining the target upload- ing protocol matched with the current network, and uploading remaining application data which is not uploaded currently based on re-determined target uploading protocol.

According to at least one embodiment of the present disclosure, [Example 9] provides a data uploading method, which further includes that:

optionally, after obtaining at least two data uploading protocols, the data uploading method further includes:

calling a domain name acquiring interface of a server and acquiring a currently available domain name corresponding to the each data uploading protocol.

According to at least one embodiment of the present disclosure, [Example 10] provides a data uploading method, which further includes that:

optionally, the performing data uploading performance tests on each data uploading protocol based on a preset performance test mode includes:

base on the preset performance test mode and the cur- rently available domain name corresponding to the each data uploading protocol, performing the data uploading performance test on the each data uploading protocol;

the based on the target uploading protocol, uploading target application data currently to be uploaded, includes: uploading the target application data currently to be uploaded based on the target uploading protocol and the currently available domain name corresponding to the target uploading protocol.

According to at least one embodiment of the present disclosure, [Example 11] provides a data uploading method, which further includes that:

optionally, the calling a domain name acquiring interface of a server and acquiring a currently available domain name corresponding to the each data uploading protocol includes:

detecting whether a current cache duration of a last available domain name corresponding to the each data uploading protocol is greater than a preset effective duration; in response to that the current cache duration detected of the last available domain name corresponding to the each data uploading protocol is greater than the preset effective duration, calling the domain name acquiring interface of the server and acquiring the currently available domain name corresponding to the data uploading protocol;

in response to that the current cache duration detected of the last available domain name corresponding to the each data uploading protocol is less than or equal to the preset effective duration, taking the last available domain name corresponding to the data uploading protocol as the currently available domain name cor- responding to the data uploading protocol.

According to at least one embodiment of the present disclosure, [Example 12] provides a data uploading appa- ratus, which includes that:

a data uploading protocol obtaining module, which is configured to obtain at least two data uploading pro- tocols in response to a preset operation triggered by a user before uploading application data;

a performance test module, which is configured to per- form data uploading performance tests on each data uploading protocol based on a preset performance test mode, and determine a target uploading protocol matched with current network based on a performance testing result; and an application data uploading module, which is config- ured to upload target application data currently to be uploaded based on the target uploading protocol in response to an application data uploading operation triggered by the user.

Furthermore, although various operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodi- ments can also be combined in a single embodiment. On the contrary, various features described in the context of a single embodiment can also be implemented in multiple embodi- ments individually or in any suitable sub-combination.

The invention claimed is:

1. A method of uploading data, comprising:

in response to a preset operation triggered by a user before uploading application data, obtaining at least two data uploading protocols;

based on a preset performance test mode, performing data uploading performance tests on each data uploading protocol, and based on a performance test result, deter- mining a target uploading protocol matched with cur- rent network;

in response to an application data uploading operation triggered by the user, and based on the target uploading protocol, uploading target application data currently to be uploaded; and wherein after obtaining the at least two data uploading protocols, the method further comprises:

calling a domain name acquiring interface of a server and acquiring a currently available domain name corre- sponding to each of the at least two data uploading protocols, wherein the calling a domain name acquiring interface of a server and acquiring a currently available domain name corresponding to each of the at least two data uploading protocols comprises:

detecting whether a current cache duration of a last available domain name corresponding to each of the at least two data uploading protocols is greater than a preset effective duration, in response to that the current cache duration of the last available domain name corresponding to each of the at least two data uploading protocols is greater than the preset effective duration, calling the domain name acquiring interface of the server and acquiring the currently available domain name corresponding to the data uploading protocol, in response to that the current cache duration of the last available domain name corresponding to each of the at least two data uploading protocols is less than or equal to the preset effective duration, taking the last available domain name corresponding to the data uploading protocol as the currently available domain name corresponding to the data uploading protocol.

2. The method according to claim 1, wherein the application data comprises: an audio, a video, an image or a file; and the preset operation comprises: a data collecting operation, a data importing operation or a data editing operation.

3. The method according to claim 1, wherein the based on a preset performance test mode, performing data uploading performance tests on each data uploading protocol, comprises:

based on the each data uploading protocol, uploading a preset data packet, and determining the performance test result corresponding to the each data uploading protocol.

4. The method according to claim 3, wherein the performance test result comprises: information about whether a speed test is successful, network speed information and round-trip time information.

5. The method according to claim 1, further comprises:

in response to that the performance test is not completely completed in the case where the user triggers the application data uploading operation, determining the target uploading protocol matched with the current network based on at least two performance test results currently completed, or, determining the target uploading protocol matched with the current network based on at least one of device model information of an uploading terminal and historical uploading information of the user.

6. The method according to claim 1, wherein the data uploading protocol comprises: an uploading protocol based on a transmission control protocol TCP, an uploading protocol based on a user datagram protocol UDP or a self-defined uploading protocol.

7. The method according to claim 6, wherein the based on the target uploading protocol, uploading target application data currently to be uploaded, comprises:

in response to that the target uploading protocol is the self-defined uploading protocol, performing a configuration optimization on the self-defined uploading protocol based on a performance test result corresponding to the self-defined uploading protocol to obtain optimized target configuration information; and based on the self-defined uploading protocol and the target configuration information, uploading the target application data currently to be uploaded.

8. The method according to claim 1, further comprising:

monitoring an uploading performance index in an uploading process of the target application data;

in response to that the uploading performance index meets a preset protocol switching condition, stopping an uploading operation, re-determining the target uploading protocol matched with the current network, and uploading remaining application data which is not uploaded currently based on re-determined target uploading protocol.

9. The method according to claim 1, wherein the based on a preset performance test mode, performing data uploading performance tests on each data uploading protocol, comprises:

based on the preset performance test mode and the currently available domain name corresponding to the each data uploading protocol, performing the data uploading performance tests on the each data uploading protocol;

wherein the based on the target uploading protocol, uploading target application data currently to be uploaded, comprises:

based on the target uploading protocol and the currently available domain name corresponding to the target uploading protocol, uploading the target application data currently to be uploaded.

10. An electronic device, comprising:

at least one processor; and a memory, configured to store at least one program;

wherein in the case where the at least one program is executed by the at least one processor, the at least one processor is caused to perform operations comprising:

in response to a preset operation triggered by a user before uploading application data, obtaining at least two data uploading protocols;

based on a preset performance test mode, performing data uploading performance tests on each data uploading protocol, and based on a performance test result, determining a target uploading protocol matched with current network;

in response to an application data uploading operation triggered by the user, and based on the target uploading protocol, uploading target application data currently to be uploaded; and wherein after obtaining the at least two data uploading protocols, the operations further comprise:

calling a domain name acquiring interface of a server and acquiring a currently available domain name corresponding to each of the at least two data uploading protocols, wherein the calling a domain name acquiring interface of a server and acquiring a currently available domain name corresponding to each of the at least two data uploading protocols comprises:

detecting whether a current cache duration of a last available domain name corresponding to each of the at least two data uploading protocols is greater than a preset effective duration, in response to that the current cache duration of the last available domain name corresponding to each of the at least two data uploading protocols is greater than the preset effective duration, calling the domain name acquiring interface of the server and acquiring the currently available domain name corresponding to the data uploading protocol, in response to that the current cache duration of the last available domain name corresponding to each of the at least two data uploading protocols is less than or equal to the preset effective duration, taking the last available domain name corresponding to the data uploading protocol as the currently available domain name corresponding to the data uploading protocol.

11. The electronic device according to claim 10, the operations further comprising:

based on the each data uploading protocol, uploading a preset data packet, and determining the performance test result corresponding to the each data uploading protocol.

12. The electronic device according to claim 10, the operations further comprising:

in response to that the performance test is not completely completed in the case where the user triggers the application data uploading operation, determining the target uploading protocol matched with the current network based on at least two performance test results currently completed, or, determining the target uploading protocol matched with the current network based on at least one of device model information of an uploading terminal and historical uploading information of the user.

13. The electronic device according to claim 10, wherein the data uploading protocol comprises: an uploading protocol based on a transmission control protocol TCP, an uploading protocol based on a user datagram protocol UDP or a self-defined uploading protocol.

14. The electronic device according to claim 13, the operations further comprising:

in response to that the target uploading protocol is the self-defined uploading protocol, performing a configuration optimization on the self-defined uploading protocol based on a performance test result corresponding to the self-defined uploading protocol to obtain optimized target configuration information; and based on the self-defined uploading protocol and the target configuration information, uploading the target application data currently to be uploaded.

15. The electronic device according to claim 10, the operations further comprising:

monitoring an uploading performance index in an uploading process of the target application data;

in response to that the uploading performance index meets a preset protocol switching condition, stopping an uploading operation, re-determining the target uploading protocol matched with the current network, and uploading remaining application data which is not uploaded currently based on re-determined target uploading protocol.

16. The electronic device according to claim 10, the operations further comprising:

calling a domain name acquiring interface of a server and acquiring a currently available domain name corresponding to the each data uploading protocol.

17. The electronic device according to claim 16, the operations further comprising:

based on the preset performance test mode and the currently available domain name corresponding to the each data uploading protocol, performing the data uploading performance tests on the each data uploading protocol;

wherein the based on the target uploading protocol, uploading target application data currently to be uploaded, comprises:

based on the target uploading protocol and the currently available domain name corresponding to the target uploading protocol, uploading the target application data currently to be uploaded.

18. A non-transitory computer-readable storage medium, on which a computer program is stored, wherein in the case where the program is executed by a processor, the program causes the processor to perform operations comprising:

in response to a preset operation triggered by a user before uploading application data, obtaining at least two data uploading protocols;

based on a preset performance test mode, performing data uploading performance tests on each data uploading protocol, and based on a performance test result, determining a target uploading protocol matched with current network;

in response to an application data uploading operation triggered by the user, and based on the target uploading protocol, uploading target application data currently to be uploaded; and wherein after obtaining the at least two data uploading protocols, the operations further comprise:

calling a domain name acquiring interface of a server and acquiring a currently available domain name corresponding to each of the at least two data uploading protocols, wherein the calling a domain name acquiring interface of a server and acquiring a currently available domain name corresponding to each of the at least two data uploading protocols comprises:

detecting whether a current cache duration of a last available domain name corresponding to each of the at least two data uploading protocols is greater than a preset effective duration, in response to that the current cache duration of the last available domain name corresponding to each of the at least two data uploading protocols is greater than the preset effective duration, calling the domain name acquiring interface of the server and acquiring the currently available domain name corresponding to the data uploading protocol, in response to that the current cache duration of the last available domain name corresponding to each of the at least two data uploading protocols is less than or equal to the preset effective duration, taking the last available domain name corresponding to the data uploading protocol as the currently available domain name corresponding to the data uploading protocol.

* * * * *